(12) United States Patent
Bagley et al.

(10) Patent No.: US 8,386,544 B2
(45) Date of Patent: Feb. 26, 2013

(54) MANAGING FLOATING POINT VARIABLES IN CONSTRAINT SATISFACTION PROBLEMS

(75) Inventors: Claire M. Bagley, Carlisle, MA (US); Joyce Ng, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1058 days.

(21) Appl. No.: 12/366,033

(22) Filed: Feb. 5, 2009

(65) Prior Publication Data

US 2010/0198901 A1 Aug. 5, 2010

(51) Int. Cl.
*G06F 7/00* (2006.01)
(52) U.S. Cl. ........................ 708/200; 708/204
(58) Field of Classification Search .................. 708/204, 708/200
See application file for complete search history.

(56) References Cited

U.S. PATENT DOCUMENTS

| | | | |
|---|---|---|---|
| 5,638,500 A * | 6/1997 | Donovan et al. ............. | 345/625 |
| 7,069,537 B2 | 6/2006 | Lazarov | |
| 7,333,968 B2 | 2/2008 | Geller et al. | |
| 2002/0107749 A1 | 8/2002 | Leslie et al. | |
| 2002/0143653 A1 | 10/2002 | DiLena et al. | |
| 2002/0166089 A1 | 11/2002 | Noy | |
| 2004/0019852 A1 | 1/2004 | Purvis | |
| 2005/0198621 A1 | 9/2005 | Tillmann et al. | |
| 2005/0278271 A1 | 12/2005 | Anthony et al. | |
| 2006/0174232 A1 * | 8/2006 | McCalla et al. ............. | 717/139 |
| 2007/0094184 A1 | 4/2007 | Emek et al. | |

OTHER PUBLICATIONS

Frühwirth, Thom et al., "Principles of Constraint Systems and Constraint Solvers", Archives of Control Sciences: Special Issue on Constraint Programming, 16(2) http://www.informatik.uni-ulm.de/pm/mitarbeiter/fruehwirth/Papers/acs-systems3.pdf, 2006.
Lhomme, Olivier, "Consistency Techniques for Numeric CSPs", Proceedings in IJCAI-93 pp. 232-238, 1993 Chambery, France.
Selectica, "Selectica Configuration", Solution Overview, 2005, Selectica Inc., San Jose, CA.
ILOG, "ILOG Configurator, Powering online product and service configuration applications", Product Dadtsheet, Mar. 2005, ILOG.S.A.
Oracle, "Oracle Configurator", Oracle Data Sheet, 2008, Oracle.
Tacton, "Tacton's Sales Configurator—Bridging the gap between engineering and sales for selling customized products.", http://www.tacton.com/templates/page_68.aspx?epslanguage=EN, 2007, Tacton Systems AB, Sweden.

(Continued)

*Primary Examiner* — Chuong D Ngo
(74) *Attorney, Agent, or Firm* — Squire Sanders (US) LLP

(57) ABSTRACT

Systems and methods for managing floating point variables are described in the present disclosure. According to one example, an embodiment of a method includes analyzing a constraint on a floating point variable in a system that supports both floating point variables and integer variables. The constraint is designed to have the ability to numerically limit the domain of the floating point variable. The method also includes determining whether or not the floating point variable can be handled as an integer variable and converting the floating point variable to a pseudo integer variable when it is determined that the floating point variable can be handled as an integer variable. This conversion of the floating point variable to a pseudo integer variable allows the domain of the floating point variable to be processed as an integer domain.

19 Claims, 2 Drawing Sheets

OTHER PUBLICATIONS

Benhamou, Frédérick et al., "Applying Interval Arithmetic to Real, Integer and Boolean Constraints", Journal of Logic Programming, 32(1), 1997.

Sabin, Daniel et al., "Configuration as Composite Constraint Satisfaction", Proceedings of the (1st) Artificial Intelligence and Manufacturing Research Planning Workshop, 1996.

Fleischanderl, Gerhard et al., "Configuring Large Systems Using Generative Constraint Satisfaction", IEEE, pp. 59-68, No. 1094-7167/98, Jul./Aug. 2008, IEEE.

Mittal, Sanjay et al., "Dynamic Constraint Satisfaction Problems", Proceedings of the Eighth National Conference on Artificial Intelligence, 1996.

Stumptner, Markus et al., "Generative Constraint-Based Configuration of Large Technical Systems", Artificial Intelligence for Engineering Design, analysis and Manufacturing, pp. 307-320, No. 12, 1998, Cambridge University Press, USA.

Gelle, Esther et al., "Solving Methods for Conditional Constraint Satisfaction", IJCAL, 2003.

* cited by examiner

MANAGING FLOATING POINT VARIABLES IN CONSTRAINT SATISFACTION PROBLEMS

TECHNICAL FIELD

The embodiments of the present disclosure generally relate to the handling of floating point variables, which may be present, for example, in constraint satisfaction problems.

BACKGROUND

A constraint satisfaction problem ("CSP") is a mathematical problem that can be solved by satisfying all the constraints of the problem such that the domain of each variable of the problem is narrowed down to a single value without violating any constraint. Each variable has a domain of possible "values," such as a range of numerical values, an enumerated set of values, a set of items, true/false, etc. Limitations among the variables are expressed as constraints, which act to limit the values that a variable may take.

A constraint solver uses reasoning techniques to find solutions to the CSPs, if any solutions exist. A solution is a state in which the domain of each variable is limited to a single value and no constraint has been violated. A reasoning process includes an "inference" operation, which includes the propagation of the constraints in the attempt to reduce the domain of participating variables, and a "search" operation, which includes making an assignment of a value to each of the variables. By applying reasoning techniques, the constraints are evaluated in order to reduce the domains of the variables. When each domain of the variables is reduced down to a single value without violating any constraints, then a solution to the CSP is found. Thus, a solution to a CSP is a unique assignment of all the variables that satisfies all the constraints of the problem. When a solution is not found, it can be said that the CSP has no solution, or that the CSP is not satisfiable.

"Constraint programming" is a paradigm for solving combinatorial search problems using artificial intelligence, computer science, databases, programming languages, operations research, etc. Currently, constraint programming is applied with success to many different technologies, such as scheduling, planning, vehicle routing, configuration, networks, bioinformatics, etc.

An example of a CSP that normally has a unique solution is Sudoku. In a typical Sudoku puzzle, squares are arranged in a 9×9 grid, where each of the 81 squares represents variables. Each variable is usually defined as an integer having a domain ranging from 1 to 9. The typical Sudoku puzzle includes a first constraint that each row in the grid includes all of the integers 1 through 9 without repeating an integer. A second constraint is that each column in the grid includes all the integers 1 through 9 without repeating an integer. A third constraint is that each of nine 3×3 blocks that are arranged in the grid includes all the integers 1 through 9 without repeating an integer. Given the values for several variables throughout the grid, the remaining variables (squares) can be evaluated using various inference techniques, such as a process of elimination, until a solution to the puzzle can be found. In this example, finding the solution to the Sudoku puzzle includes the filling of the squares with the integers 1 through 9 without violating any of the three constraints.

SUMMARY

The present disclosure describes several embodiments of systems, methods, and processing logic. Regarding one particular embodiment, a method as described herein comprises analyzing a constraint on a floating point variable in a system that supports both floating point variables and integer variables. In particular, the constraint has the ability to numerically limit a domain of the floating point variable. The method also includes determining whether or not the floating point variable can be handled as an integer variable. The floating point variable is converted to a pseudo integer variable when it is determined that the floating point variable can be handled as an integer variable. Converting the floating point variable to a pseudo integer variable allows the domain of the floating point variable to be processed as an integer domain.

Other features, advantages, and implementations of the present disclosure, not expressly disclosed herein, will be apparent to one of ordinary skill in the art upon examination of the following detailed description and accompanying drawings. It is intended that such implied implementations of the present disclosure be included herein.

BRIEF DESCRIPTION OF THE DRAWINGS

The components of the following figures are illustrated to emphasize the general principles of the present disclosure. Reference characters designating corresponding components are repeated as necessary throughout the figures for the sake of consistency and clarity.

DETAILED DESCRIPTION

Figure 1:
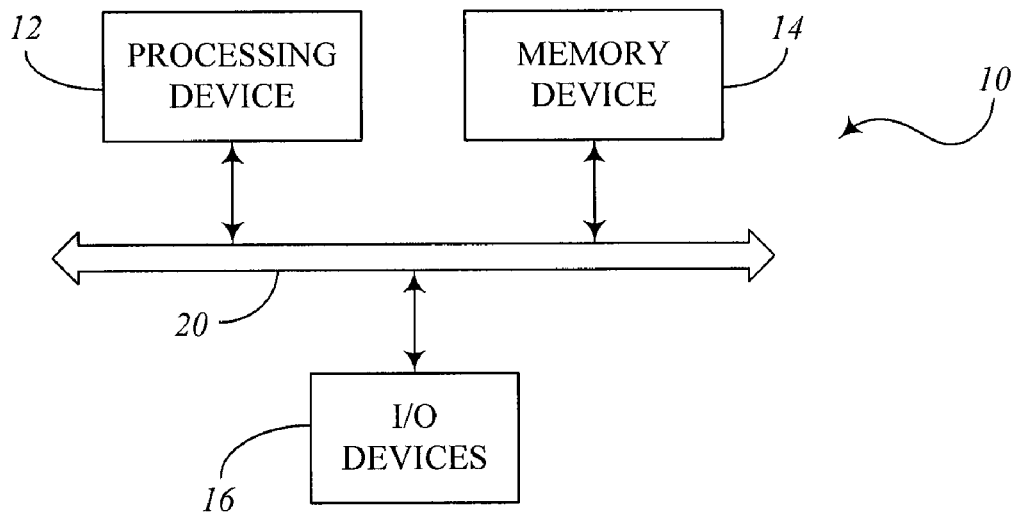
FIG. 1 is a block diagram illustrating a computing system according to one embodiment.

In a constraint satisfaction problem ("CSP"), solutions are obtained by satisfying constraints that limit the values of the problem's variables. To solve the CSP, iterative analysis can be made to the constraints to narrow the domain of each variable until a solution is found or to prove that there is no solution. CSPs may include any types of variables, such as, for example, floating point variables, integer variables, Boolean variables, set variables (variables having domains that include a predefined set of values or objects), etc. With each constraint, a solver uses reasoning processes to remove the values of the domain that do not satisfy the constraint. A solution is found when each variable is assigned a value that satisfies all the constraints of the problem. Typically, a computer or other processing device is needed to solve a CSP.

The systems and methods described herein refer to the underlying computer software issues regarding the handling of floating point variables. A "floating point variable" is a variable that includes floating points ranging from a minimum value to a maximum value. A "floating point" refers to a numeric value having a string of digits and a decimal point, which "floats," located anywhere along the string of digits. An example of a floating point is a number that is represented in scientific notation, wherein the number 2,352,800,000, for instance, can be represented in scientific notation as $2.3528 \times 10^9$. Regarding the representation of floating point variables in CSPs, the domain of the floating point variable is defined by the minimum and maximum limits or bounds of the domain, rather than trying to store all the intermediate values, which would require a very large amount of storage. For example, there are more than $10^{18}$ floating point values between a small interval from −1 to 1.

Most reasoning processes only reason over the bounds of the domain of a floating point variable, but not within. For example, for a floating point variable with domain [1.5 . . . 3.5], the reasoning would typically only happens over 1.5 and 3.5, but not over the internal values between the boundaries. It is not usually possible to eliminate specific values from the domain of a floating point variable. The problem with reasoning over floating point variables in a constraint system is due to a combination of the imprecision of the representation of floating points in a computer system and the inherent difficulty to reason efficiently over continuous ranges. This weakness is highlighted in systems that support mixed numeric variables.

In comparison with floating points, an integer is a whole number that does not include a decimal point or any digits located after a decimal point. The domain of integer variables may include a range, such as, for example, [4 . . . 8], which includes the integer or whole numbers 4, 5, 6, 7, and 8. Alternatively, the domain of integer variables may include a set of values, such as, for example, {3, 5, 8, 9, 14, 19}. Because of the much smaller size of the domain of integer variables compared to floating point variables and because of the availability of processing techniques for integer variables, as discussed in more detail below, it can be seen that the inference power over integer variables is stronger than over floating point variables. The term "inference power," as used herein, refers to the logical analysis or intellectual processing involved in order to narrow the domain of one or more variables. It should be understood that it is easier to narrow down the domain for integer variables than for floating point variables.

Certain powerful inference techniques, such as some forms of "arc consistency," are only performed over discrete variables (integer variables being a subclass of discrete variables) and not on floating point variables. The inference power over floating point variables can therefore be considered to be weaker and more complex. Furthermore, the representation of the domain of a floating point variable is less precise than integer variables. Due to the limitations of binary representation, the implementation of real numbers for floating points in computer systems is an imprecise approximation. Certain mathematical operations on floating points can introduce rounding errors. Some CSP systems rely on techniques to compensate for this imprecision. One such technique is known as extended interval. This specialized handling to compensate for errors introduced by the imprecise approximation comes at an additional computation and memory cost. On the other hand, integers have a precise representation and require no specialized handling. Therefore, converting the domain of a floating point variable to an integer domain, when possible, may result in many advantages regarding the processing and handling of the variable. As described in the present disclosure, a floating point variable can be converted to a "pseudo integer variable," in order to benefit from the advantages of integer variables.

To illustrate the weakness of the inference power for floating point variables, consider a CSP example where a first variable is defined as an integer variable I with a domain having a range [3 . . . 7] and a second variable is defined as a floating point variable F with a domain having a range [3.5 . . . 6.3]. Also consider in this example that there are two constraints in the CSP, the two constraints being "F≠5" and "F=I." Since only the outer bounds of the domain of a floating point variable can be limited by a constraint, the first constraint F≠5 does not have any effect to limit F. A system is not able to reason over any holes within a floating point domain. By applying these constraints, the domain of I is reduced to the set {4, 5, 6} and the domain of F is reduced to the range [4.0 . . . 6.0]. In this case, there would still be many floating point numbers in between the range of 4.0 and 6.0 in the domain of variable F.

However, with the pseudo integer variable approach, variable F is converted to a pseudo integer variable after reasoning over the constraint F=I, since this constraint limits F to only integer values. Thus, both variables F and I can be reduced to {4, 5, 6}. Additionally, by revisiting the first constraint F≠5 and reasoning over this constraint, F can be further reduced to {4, 6}, which is a significant reduction compared to the range [4.0 . . . 6.0] that results without the benefit of being able to convert the floating point variable to a pseudo integer variable. Therefore, the system can have stronger inference power, more accurate computation, and better computation times with pseudo integer variables as compared with floating point variables.

Specifically, the switching of the domain happens during the reasoning over a constraint and its floating point participant(s). The switching operation is made possible in a system supporting mixed numeric variables (floating point variables and integer variables) that participate together in a constraint. The specific criteria for converting a floating point variable to a pseudo integer variable may differ on a per constraint basis.

In a situation where a floating point variable can be handled as an integer variable, it would be advantageous to convert the floating point variable to a pseudo integer variable. Therefore, the processing of the pseudo integer allows the same type of processing as a regular integer and therefore obtains the same benefits of an integer as mentioned above. In a CSP, the inference power can be increased for a variable that has been converted from a floating point variable to a pseudo integer variable.

Although many of the examples mentioned in the present disclosure describe floating point variables used in CSPs, it should be understood that the systems and methods of managing floating point variables as described in the present disclosure may also include applications in other systems that process floating point variables.

FIG. 1 is a block diagram of an embodiment of a computing system 10. Particularly, computing system 10 may be a computer, data processing system, or other suitable electronic device for executing logic instructions, e.g., software applications. In the embodiment shown in FIG. 1, computing system 10 includes a processing device 12, a memory device 14, and input/output ("I/O") devices 16, each interconnected via a bus interface 20.

Generally, computing system 10 can include processing means for analyzing how floating point variables are used. The system provides means for recognizing when the domain of a floating point variable is limited to an integer domain. Furthermore, a floating point variable has the ability to substitute the internal representation of its float domain with an integer domain. With respect to this substitution, the floating point variable is converted to a pseudo integer variable. As a result, the domain size is reduced drastically after a floating point variable is converted to a pseudo integer variable. Consequently, the pseudo integer variable can benefit from consistency checking techniques and other inference techniques that may only be available to integer variables.

Processing device 12 may be a general-purpose or specific-purpose processor or microcontroller. Memory device 14 may include one or more internally fixed storage units, removable storage units, and/or remotely accessible storage units. The storage units can be configured to store information, data, instructions, and/or software code. The storage units may include any suitable combination of volatile memory and/or non-volatile memory. Input/output devices 16 may include input mechanisms such as keyboards, keypads, cursor control devices, or other data entry devices. The input mechanisms enable a user to enter information or instructions. Input/output devices 16 also include output devices, such as computer monitors, audio output devices, printers, or other peripheral devices for communicating information to the user.

Figure 2:
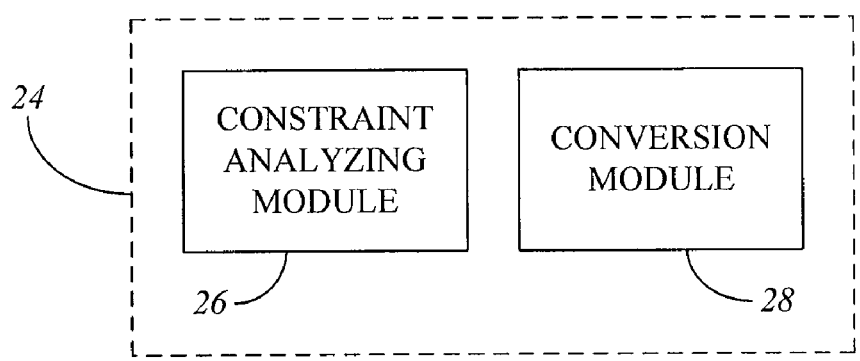
FIG. 2 is a block diagram illustrating a floating point variable handling module according to one embodiment.

FIG. 2 is a block diagram showing an embodiment of a floating point variable handling module 24. In some embodiments, floating point variable handling module 24 can be a part of a CSP solving module, which can be configured to solve a CSP. In other embodiments, floating point variable handling module 24 can be a part of a configurator, such as a product configurator, which can be used for guiding a buyer through a set of products and options. In this case, the configurator can map a list of customer selections in real time to available sets of products, product features, product options, services, service options, and so on. Floating point variable handling module 24 can be used in any system that supports mixed numeric variables, e.g., floating point variables and integer variables. In this regard, these systems may include constraint-based systems or non-constraint-based systems.

The embodiments of floating point variable handling module 24 described in the present disclosure can be implemented in hardware, software, firmware, or a combination thereof. When implemented in software or firmware, floating point variable handling module 24 can be stored in memory device 14 (FIG. 1) and executed by processing device 12. Alternatively, when implemented in hardware, floating point variable handling module 24 can be implemented in processing device 12 using discrete logic circuitry, an application specific integrated circuit (ASIC), a programmable gate array (PGA), a field programmable gate array (FPGA), or any combination thereof.

Floating point variable handling module 24, which can be stored partially or fully in memory device 14, in addition to any other software, programs, or computer code including executable logical instructions as described herein, can be embodied in computer-readable media for execution by any suitable processing device. The computer-readable media as described herein can include one or more suitable physical media components that can store the software, programs, or computer code for a measurable length of time.

In the embodiment of FIG. 2, floating point variable handling module 24 includes a constraint analyzing module 26 and a conversion module 28. In general, constraint analyzing module 26 is configured to analyze the constraints that pertain to floating point variables. Particularly, constraint analyzing module 26 can determine how a floating point variable is used in an equality or equation constraint, e.g., $A=3B+7$. In many instances, constraint analyzing module 26 may be able to deduce that the floating point variable is limited by a constraint such that the floating point variable can only have a value that is an integer. In this example, if B is known to be an integer, then constraint analyzing module 26 can deduce that A is also an integer. On the other hand, if A is known, then, in order to deduce that B is an integer, constraint analyzing module 26 would have to determine whether $(A-7)/3$ is an integer.

Conversion module 28 generally operates in conjunction with constraint analyzing module 26. Particularly, when constraint analyzing module 26 reasons that a particular floating point variable is limited to only integer values, then conversion module 28 is configured to flag the floating point variable as a pseudo integer variable. In this regard, floating point variable handling module 24 is able to handle the floating point variable as an integer, along with the possible inference processing techniques available only to integers. In other embodiments, conversion module 28 can convert the floating point variable itself to an integer variable.

In particular, constraint analyzing module 26 can analyze the use of the floating point variable to see how it is used in a constraint. If certain criteria exist that define or limit the floating point variable to an integer domain, which includes only integer values, then the floating point variable is converted to a pseudo integer variable. For example, constraint analyzing module 26 may first evaluate whether the constraint is an equality constraint equating the floating point variable with one or more integer variables and/or integer values. For example, suppose a constraint being analyzed by constraint analyzing module 26 is the equation $A=B+C$. If two of the three variables of this equation are integers or integer variables and the remaining variable is a floating point variable, constraint analyzing module 26 can conclude that, in the context of this constraint, the remaining variable can be treated as an integer variable. Therefore, the floating point variable can be converted to a pseudo integer variable. A benefit of this conversion is that the domain size can be reduced drastically. Also, the time required for a processor to search through multiple possible values of a floating point number can be reduced when a floating point variable is converted to a pseudo integer variable. The converted variable can also benefit from consistency checking techniques and other inference techniques that are normally only available to integer variables.

Figure 3:
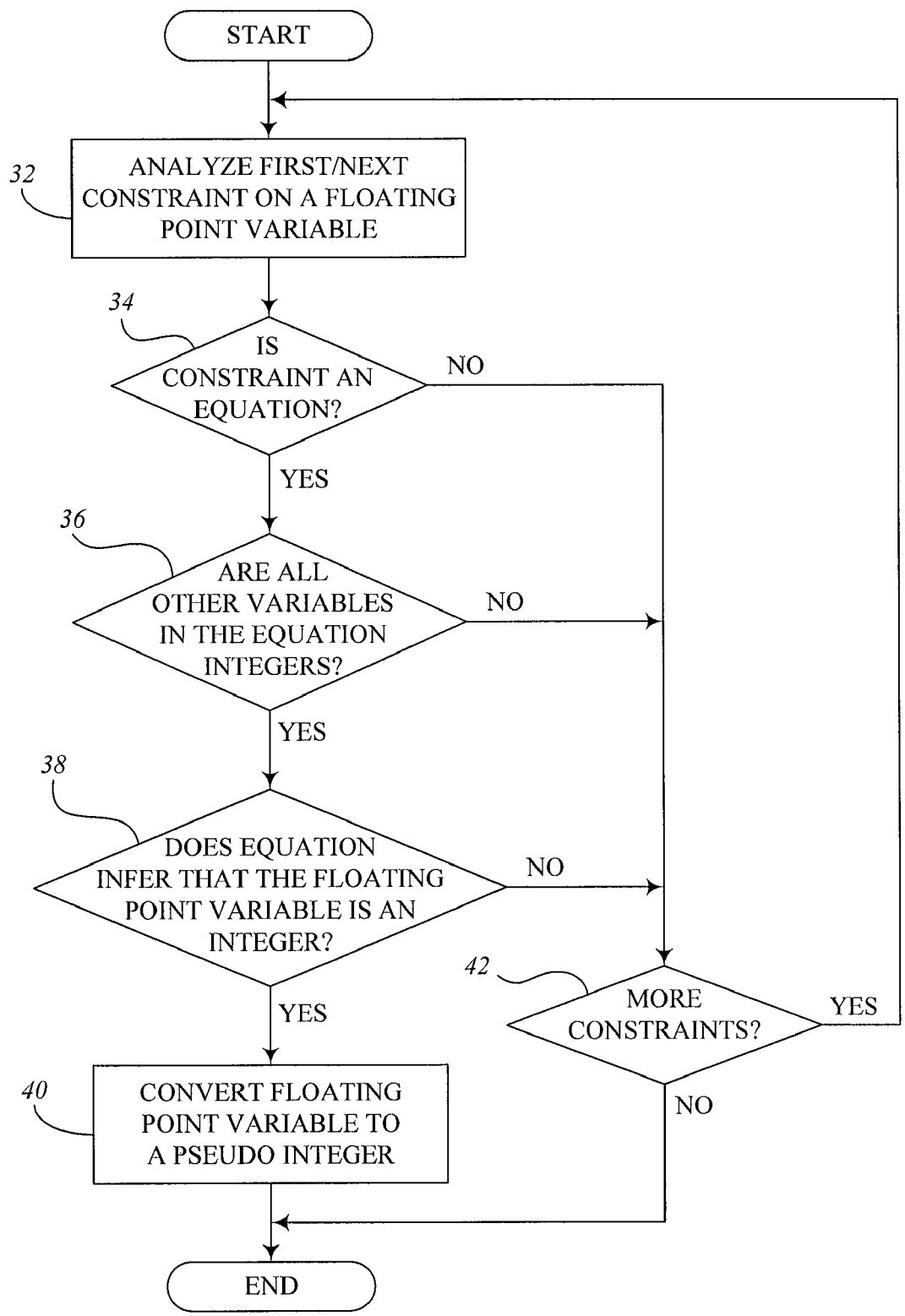
FIG. 3 is a flow diagram of a method for handling a floating point variable according to one embodiment.

FIG. 3 is a flow diagram illustrating an embodiment of a method for handling a floating point variable. In some embodiments, the floating point variable, which is processed according to the method described herein, may be used in a CSP solving system. As indicated in block 32, a first constraint on a floating point variable is analyzed. If more than one constraint is applied to the floating point variable, the additional constraints can be analyzed in subsequent processing operations as well. Also, some constraints can be analyzed multiple times, as necessary. In this respect, each constraint may be repeated any number of times, according to the respective inference processing techniques involved, to help reduce the domains of the variables.

As indicated in decision block 34, it is determined whether or not the constraint is an equation. If so, the method proceeds to block 36. If the constraint is not an equation, the method skips ahead to block 42. As indicated in decision block 36, it is determined whether or not all the other variables in the equation, other than the floating point variable that is being analyzed, are integers or integer variables. It can also be determined whether or not all the constants in the equation are integers. If all of the other variables (and/or constant values) are not integers, then the method jumps ahead to block 42. However, if all the other variables and/or constants are integers, then the method proceeds to block 38. In some embodiments, decision block 36 may be omitted, depending on the complexity of the inference processing involved.

As indicated in decision block 38, it is determined whether or not it can be inferred that the floating point variable is an integer variable. The method can determine whether or not inference can be made that the floating point variable can be treated as an integer variable based on how the mathematical operations and variables are used in the equation. Suppose, for instance, that the constraint being analyzed is the equation $A=(3*B)+C-5+D^2$, where A is the floating point variable under test, and B, C, and D are integer variables. In this case, it can be inferred that A must also be an integer, since all the other variables and/or constants in the equation are integers and since the mathematical operations are used in a way such that the variable A must be an integer. Regarding a more complex example, suppose that the constraint being analyzed is the equation L=(M/2)+(3*N), where L is the floating point variable under test, M and N are integers, and M is limited to even numbers. In this case, it can also be inferred that L must be an integer as well, since it can be reasoned that the value (M/2) is an integer. Of course, this second example would require another level of analysis, i.e., analyzing the value (M/2).

If it can be inferred in block 38 that the floating point variable can only have integer values, then the method proceeds to block 40. Otherwise, if no such inference can be made, then the method proceeds to block 42. According to block 40, the floating point variable is converted to a pseudo integer variable. As a pseudo integer variable, the variable can be treated or handled as an integer, which can greatly reduce the domain of the variable and can simplify the solving of a CSP. In systems that support both floating point and integer variables, even non-CSP type systems, the handling of the floating point variable as a pseudo integer variable can increase the speed of computation and also enable more accurate calculations.

If the constraint does not fulfill the criteria to trigger the conversion from floating point variable to pseudo integer variable (as mentioned with respect to blocks 34, 36, and 38), then the method eventually arrives at block 42. As indicated in decision block 42, it is determined whether or not there are more constraints to be analyzed. If so, the method returns back to block 32 to analyze the next constraint. It can also be determine whether a previous constraint that has already been analyzed is to be analyzed again, based on the particular inference techniques in use. However, if there are no more constraints to be analyzed, then the method ends.

It should be understood that the steps, processes, or operations described herein may represent any module or code sequence that can be implemented in software or firmware. In this regard, these modules and code sequences can include commands or instructions for executing specific logical steps, processes, or operations within physical components. It should further be understood that one or more of the steps, processes, and/or operations described herein may be executed substantially simultaneously or in a different order than explicitly described, as would be understood by one of ordinary skill in the art.

The systems and methods of evaluating the usage of floating point variables to determine when the domain of the floating point variable can be handled as an integer variable can provide a number of benefits. For example, as a result, by converting a floating point variable to a pseudo integer variable, when appropriate, the reasoning methods used for integer variables can be applied to the pseudo integer variables as well. Also, the inference power can be increased in a problem in general, and the complexity of solving a problem can be reduced. Furthermore, the systems and methods can process the variable more efficiently and reach the solution more efficiently.

The embodiments described herein represent a number of implementations and examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

We claim:

1. A method of operating a product configurator in a computer system comprising a constraint analyzing module and a conversion module, the method comprising:
    analyzing at a processor during a product configuration session using the constraint analyzing module a constraint on a floating point variable, wherein the computer system supports both floating point operations and integer operations, the constraint having the ability to numerically limit a domain of the floating point variable;
    determining by the processor if the floating point variable can be handled during the product configuration session as an integer variable; and
    converting by the processor using the conversion module the floating point variable to a pseudo integer variable if it is determined that the floating point variable can be handled as an integer variable;
    wherein converting the floating point variable to a pseudo integer variable allows the domain of the floating point variable to be processed as an integer variable when generating a product configuration by the product configurator, wherein the generating comprises solving a constraint satisfaction problem.

2. The method of claim 1, wherein determining if the floating point variable can be handled as the integer variable further comprises determining if it can be inferred from the constraint that the domain of the floating point variable is limited to an-integer domain.

3. The method of claim 1, wherein determining if the floating point variable can be handled as the integer variable further comprises determining if the constraint is an equation.

4. The method of claim 3, wherein determining if the floating point variable can be handled as the integer variable further comprises determining if the variables in the equations other than the floating point variable are integer variables.

5. The method of claim 3, wherein determining if the floating point variable can be handled as the integer variable further comprises determining if the equation infers that the floating point variable is limited to having integer values.

6. The method of claim 5, wherein determining if the equation infers that the floating point variable is limited to having integer values further comprises analyzing how the mathematical operations and variables are used in the equation.

7. The method of claim 1, wherein the method further comprises:
    analyzing a second constraint on the floating point variable;
    determining from the second constraint if the floating point variable can be handled as the integer variable; and
    converting the floating point variable to a pseudo integer variable if it is determined that the floating point variable can be handled as the integer variable.

8. A non-transitory computer readable medium storing instructions executable by a processing device, the computer readable medium comprising:
    logic adapted to analyze a constraint on a floating point variable during a product configuration session in a product configurator that supports both floating point operations and integer operations, the constraint having the ability to limit a domain of the floating point variable;
    logic adapted to determine, based on the analysis of the constraint, if the floating point variable can be handled during the product configuration session as an integer variable; and logic adapted to convert the floating point variable to a pseudo integer variable when it is determined that the floating point variable can be handled as an integer variable, the conversion allowing the floating point variable to be processed like an integer variable when generating a product configuration by the product configurator, wherein the generating comprises solving a constraint satisfaction problem.

9. The non-transitory computer readable medium of claim 8, wherein the logic adapted to determine further comprises logic adapted to infer from the constraint if the domain of the floating point variable is limited to an integer domain.

10. The non-transitory computer readable medium of claim 8, wherein the logic adapted to determine further comprises logic adapted to determine if the constraint is an equation.

11. The non-transitory computer readable medium of claim 10, wherein the logic adapted to determine further comprises logic adapted to determine if the variables and/or constant values in the equations other than the floating point variable are integer variables.

12. The non-transitory computer readable medium of claim 10, wherein the logic adapted to determine further comprises logic adapted to determine if the equation infers that the floating point variable is limited to only integers.

13. The non-transitory computer readable medium of claim 8, further comprising:
    logic adapted to analyze a second constraint on the floating point variable;
    logic adapted to determine from the second constraint if the floating point variable can be handled as an integer variable; and
    logic adapted to convert the floating point variable to a pseudo integer variable if it is determined that the floating point variable can be handled as an integer variable.

14. A product configurator system comprising:
    a processor;
    a non-transitory computer readable medium coupled to the processor that when executed by the processor causes the processor to handle a floating point variable using modules comprising:
    a constraint analyzing module configured to analyze a constraint on a floating point variable during a product configuration session in the product configurator system that supports both floating point operations and integer operations, the constraint having the ability to limit a domain of a variable; and
    a conversion module configured to convert the floating point variable to a pseudo integer variable when it is determined that the floating point variable is limited to an integer domain;
    wherein conversion to a pseudo integer variable allows the floating point variable to be processed as an integer variable when generating a product configuration by the product configurator system, wherein the generating comprises solving a constraint satisfaction problem.

15. The product configurator system of claim 14, wherein the constraint analyzing module uses an inference technique on the constraint to determine if the floating point variable is limited to an integer domain.

16. The product configurator system of claim 15, wherein the constraint analyzing module uses the inference technique to determine if the constraint is an equation, to determine if the variables in the equations other than the floating point variable are integer variables, and to determine if the equation infers that the floating point variable is limited only to having integer values.

17. The product configurator system of claim 14, wherein the constraint analyzing module is further configured to analyze a second constraint on the floating point variable to determine from the second constraint if the floating point variable is limited to an integer domain, and wherein the conversion module is further configured to convert the floating point variable to a pseudo integer variable if the constraint analyzing module determines from the second constraint that the floating point variable is limited to an integer domain.

18. A constraint satisfaction problem (CSP) solver for determining possible solutions to a CSP, the (CSP) solver supporting both floating point operations and integer operations and comprising:
    a processor;
    a non-transitory computer-readable medium coupled to the processor and storing at least one module that is executed by the processor, the functionality of the module when executed comprising:
    analyzing a constraint on a floating point variable to determine if the floating point variable can be handled as an integer variable; and
    converting the floating point variable to a pseudo integer variable when the analyzing determines that the floating point variable can be handled as an integer variable.

19. The CSP solver of claim 18, wherein a pseudo integer variable can be processed like an integer variable.

* * * * *

UNITED STATES PATENT AND TRADEMARK OFFICE
CERTIFICATE OF CORRECTION

| | | |
|---|---|---|
| PATENT NO. | : 8,386,544 B2 | |
| APPLICATION NO. | : 12/366033 | |
| DATED | : February 26, 2013 | |
| INVENTOR(S) | : Bagley et al. | |

It is certified that error appears in the above-identified patent and that said Letters Patent is hereby corrected as shown below:

On the Title Page, in column 2, under "Other Publications", line 10, delete "Dadtsheet," and insert -- Datasheet, --, therefor.

On Title page 2, in column 2, under "Other Publications", line 9, delete "IJCAL, 2003." and insert -- IJCAL 2003. --. therefor.

In the Claims

In column 8, line 28, in Claim 2, delete "an-integer" and insert -- an integer --, therefor.

In column 10, line 31, in Claim 18, delete "(CSP)" and insert -- CSP --, therefor.

Signed and Sealed this
Fourth Day of June, 2013

Teresa Stanek Rea
*Acting Director of the United States Patent and Trademark Office*